May 15, 1956  R. A. DEHN  2,745,910
HIGH FREQUENCY ELECTRIC DISCHARGE DEVICE COUPLING APPARATUS
Filed Dec. 22, 1950
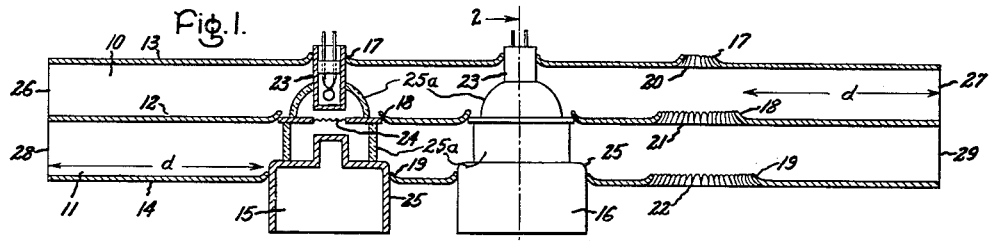
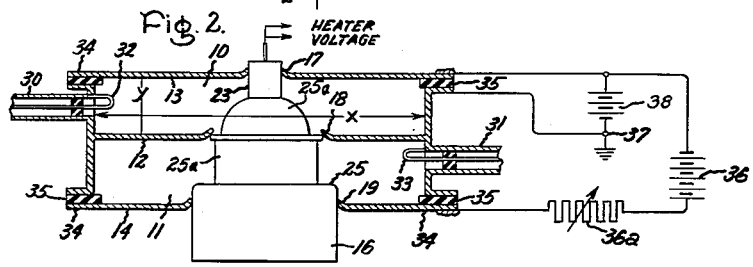
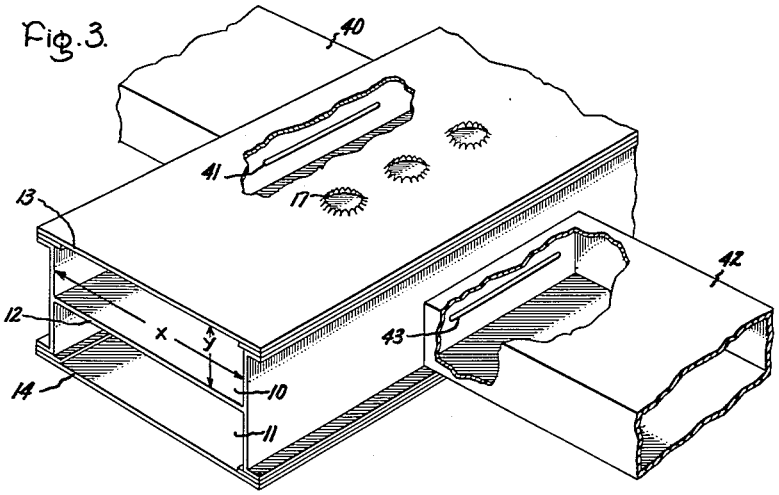
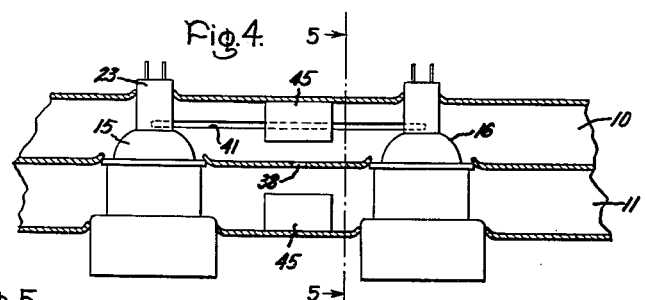
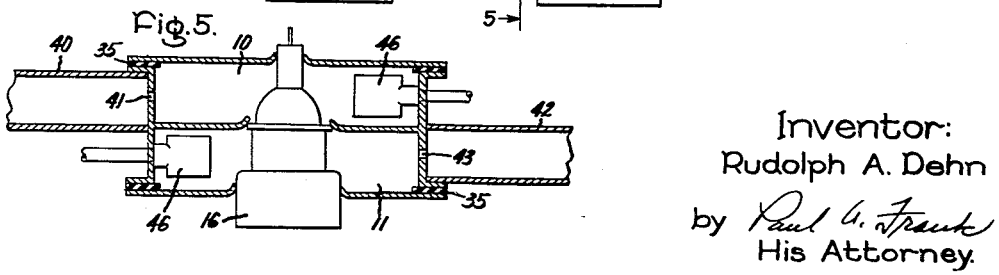
Inventor:
Rudolph A. Dehn
by Paul G. Frank
His Attorney.

United States Patent Office 2,745,910
Patented May 15, 1956

2,745,910

HIGH FREQUENCY ELECTRIC DISCHARGE DEVICE COUPLING APPARATUS

Rudolph A. Dehn, Schenectady, N. Y., assignor to General Electric Company, a corporation of New York Application December 22, 1950, Serial No. 202,258

14 Claims. (Cl. 179—171)

My invention relates to high frequency electromagnetic energy controlling apparatus and, more particularly, to apparatus for coupling a plurality of high frequency electric discharge devices together for such purpose as providing a greater power output than normally obtainable from a single discharge device.

High frequency electric discharge devices of small power handling capacity, are now readily available at moderate cost. However, in many applications of high frequency energy, more power is required than can conveniently be handled by a single discharge device of this type. Consequently, it has ordinarily been necessary to design a special discharge device for these higher power applications, or else to duplicate the complete amplifier or oscillator circuit, as the case may be, and then to connect the respective outputs of these circuits in parallel. Such specially designed tubes are, of course, expensive; and the duplication of circuitry involved in connecting a number of smaller discharge devices in parallel is wasteful of equipment and results in cumbersome apparatus.

There are, however, a number of very difficult problems involved in providing an apparatus for combining the power output of a plurality of these readily available discharge devices. For optimum performance, the operation of the various discharge devices should be completely synchronized so that the power output from each device will be in proper additive phase relation to be combined. Moreover, the reactive interaction between each discharge device of the multiple circuit should be minimized in order that the frequency characteristics of the combination may remain similar to that for a single device circuit. Furthermore, it is highly desirable that discharge devices of slightly nonuniform characteristics, such as those readily available commercially, should work together properly in such multiple device coupling apparatus. Other desired conditions, quite difficult of attainment, are that the number of controls and adjustments be few and that the output energy be undistorted by the intercoupling of the discharge devices. Since the intercoupled devices are to be employed for higher power, it is also desirable that the coupling apparatus be adapted to forced air cooling.

Accordingly, an object of my invention is to provide a coupling apparatus for a plurality of high frequency electric discharge devices wherein the power output from the coupling apparatus is approximately equal to the sum of the power outputs obtainable from each discharge device.

Another object of my invention is to provide a multiple discharge device coupling apparatus having, in general, the same frequency characteristics as a comparable single discharge device circuit.

Another object of my invention is to provide a multiple discharge device coupling apparatus which may be employed as high frequency amplifier or oscillator of much higher power than that obtainable with any single discharge device of the circuit.

A further object of my invention is to provide a coupling apparatus which may be employed with many different types of commercially available high frequency discharge devices and which will provide suitable additive coupling between similar type discharge devices whose uniformity of electrical characteristics is no greater than that normally present in commercially available devices.

A further object of my invention is to provide a coupling apparatus for a plurality of high frequency discharge devices wherein energy may be supplied to or energy may be delivered from each intercoupled discharge device in a manner such that each device contributes equally to the total power produced by the circuit.

A still further object is to provide a coupling apparatus which may easily be subjected to forced air cooling when employed in high power applications.

In general, my invention comprises a wave guide dimensioned to support an electromagnetic wave pattern along the width of the guide but to cause an attenuation of the electromagnetic wave energy along the length thereof. Spaced along the length of the wave guide are means for making connection with selected electrodes of electric discharge devices inserted within the guide. This wave guide then functions along its transverse axis, i. e. along the width thereof, as a cavity resonator associated with the inserted electric discharge devices. The various connection making means are preferably longitudinally spaced apart a distance less than a predetermined decibel attenuation of the electromagnetic wave energy along the length of the guide in order that inherent synchronization of the electromagnetic wave patterns of the various discharge devices may be achieved. In a modification of the invention, the longitudinal spacing of the connection making means may be greater than would normally be equal to this predetermined decibel attenuation, but suitable energy coupling elements are inserted along the length of the guide to prevent such attenuation.

If an open ended wave guide is employed, these connection making means are longitudinally spaced from the ends of the guide by a distance sufficient to produce an attenuation of the electromagnetic wave energy to a negligible amount at the ends of the guide. If a closed ended transmitting means is employed, a comparable if not greater spacing from the ends of the guide is made in order to prevent undesirable reflections of the electromagnetic wave energy. The guide is preferably open ended, however, in order to provide a convenient passage through which a coolant such as air may be forced.

Where several electric discharge devices are to be coupled together, energy is preferably coupled to or from the wave guide through a longitudinal slot formed in a side of the guide. This slot is preferably substantially coextensive with the longitudinally spaced connection making means in order that direct communication to the field associated with the inserted discharge devices may be made through the slot without distorting the electromagnetic wave patterns established in the wave guide. This slot preferably also communicates with another wave guide connected to the multiple discharge device coupling guide in order to effect an energy transfer with an external circuit.

The novel features which I believe to be characteristic of my invention are set forth with particularity in the appended claims. My invention itself, however, together with further objects and advantages thereof may best be understood by reference to the following description taken in connection with the accompanying drawing in which: Fig. 1 is a longitudinal cross-sectional view of one embodiment of my invention illustrating its use in conjunction with electric discharge devices of a conventional type known as "light house tubes"; Fig. 2 is a transverse sectional view of the apparatus of Fig. 1 taken along line 2—2 of Fig. 1; Fig. 3 is a fragmentary perspective view of the intercoupling apparatus of Fig. 1 illustrating a modification whereby a more uniform energy coupling to the wave guide of my invention may be achieved; Fig. 4 is a longitudinal sectional view of a portion of a multiple discharge device intercoupling apparatus illustrating a further modification of my invention whereby electric discharge devices associated therewith may be spaced apart a greater distance than permissible with the device of Fig. 1; and Fig. 5 is a transverse sectional view taken along 5—5 of Fig. 4 illustrating a means of insuring frequency synchronization between the various discharge devices coupled together by the coupling apparatus of Fig. 4.

Referring to Fig. 1 I have shown my invention in one form as comprising a pair of back-to-back wave guides 10 and 11 each preferably having a rectangular cross-section, as indicated in Fig. 2. Wave guides 10 and 11 are preferably constructed in the form of an integral unit by using a common central dividing wall or septum 12 extending parallel to the top and bottom walls 13 and 14 respectively. When employed in conjunction with inserted electric discharge devices in a manner to be described hereinafter, wave guides 10 and 11 also function as cavity resonators associated with these inserted discharge devices.

Longitudinally spaced along the central portion of wave guides 10 and 11 there are provided means for making connection with the effective electrodes of electric discharge devices inserted within the wave guides 10 and 11 respectively. In Fig. 1, I have shown my invention in conjunction with a pair of conventional high-vacuum three element disk-seal type high frequency discharge devices 15 and 16 commonly called "light-house" tubes. In such devices the respective electrodes are disk-shaped and arranged in parallel planes with external contact disks or cylinders spaced by hollow cylindrical insulators completing the device envelope. Since long leads are eliminated and connections are made to the electrode peripheries, such devices are adapted for use in high frequency apparatus of the space resonant type. When employed in conjunction with such disk-seal type high frequency discharge devices, the electrode connection making means may conveniently take the form of annularly arranged contact fingers 17, 18 and 19 formed in walls 13, 12 and 14 respectively of wave guides 10 and 11. These contact fingers 17, 18 and 19, are arranged to form the rim of apertures 20, 21 and 22 which are of suitable diameter to enable discharge devices 15 and 16 to be inserted within the wave guides 10 and 11 along a transverse axis perpendicular to guide walls 12, 13, 14.

Although for purposes of illustration, I have shown the right hand set of contact means 17, 18 and 19 without an inserted discharge device, it will be appreciated that in normal operation an additional discharge device will be inserted therein. When discharge devices 15, 16 are inserted to a proper depth, contact fingers 17, 18 and 19 make tight frictional engagement with cylindrical electrodes 23, 24 and 25 respectively of the discharge devices 15 and 16. The insulating envelope cylinders 25a are interposed between the walls of the waveguide and as dielectrics do not materially affect the waveguide characteristics. The dimension and location of the contact means 17, 18 and 19 may, of course, be suitably altered to be adapted to any similar type high frequency electric discharge device.

In the particular discharge device shown, electrode 23 comprises the cathode, electrode 24 the control electrode, and electrode 25 the anode of the device. A portion of the wave guide 10 in the vicinity of each electric discharge device 15, 16 may, therefore, be considered as the control electrode-cathode cavity resonator thereof. Similarly, a portion of the wave guide 11 in the vicinity of each discharge device may be considered the control electrode-anode resonator thereof. The gaps between the adjacent electrodes are relatively small, however, compared to the spacing between the adjacent resonator walls which are in contact with the electrode peripheries, thus substantially increasing the capacitance between the resonator walls in the vicinity of the interelectrode gaps. It will be appreciated that since I have shown my invention in conjunction with triode type electric discharge devices, I have employed two wave guides constituting control electrode-anode and control electrode-cathode resonators respectively. However, if dyotron, klystron or other single gap discharge devices are employed, only one wave guide, such as wave guide 10, comprising the sole resonator for the device need be employed for the purposes of this invention. Similarly, additional wave guide regions extending parallel to wave guides 10 and 11 may be employed if necessary for the particular multielectrode device involved. In general, each wave guide constitutes a complete and operable intercoupling unit, as will be more fully described hereinafter. However, interaction between adjacent wave guides may be easily accomplished for such purpose as regenerative or degenerative coupling in suitable oscillator and amplifier circuits.

Wave guides 10 and 11 are dimensioned to support an electromagnetic standing wave pattern along the width or transverse axis indicated by the letter X of Fig. 2 when the discharge devices are inserted. This means that for the transverse electric mode of operation of the first order ($TE_{01}$), the effective transverse dimension must be electrically equal to one-half wave length at the desired frequency of operation. When a discharge device is inserted within the wave guides 10 and 11 the interelectrode capacitances thereof function to add length to the transverse dimension X and thus to require foreshortening of this transverse dimention for any desired frequency of operation. Consequently, the actual transverse dimension X is less than one-half wave length of a frequency at which a transverse axis wave pattern may be established. Since cut-off of wave propagation along the length of the guide occurs at a wave length equal to twice the effective transverse dimension of the guide, no electromagnetic wave propagation occurs along the length of the guide at the wave length at which a transverse standing wave pattern is established in the guide in the vicinity of the inserted discharge devices; the wave pattern being attenuated as it travels along the length of the guide. In other words, the capacitive loading effect of the inserted discharge devices tends to lower the natural resonant frequency of a transverse dimension wave pattern, such that a wave of this resonant frequency has a wave length that is too long to sustain propagation in regions of the wave guide where no such capacitive loading occurs.

The cavity resonators comprising the wave guides 10 and 11, therefore, resonate at a frequency where electromagnetic standing wave patterns are established in the transverse direction only with no sustained propagation along the longitudinal axis. It will thus be appreciated that this transverse dimension X, as foreshortened to compensate for the inserted discharge devices, fixes the frequency of resonance of the system. The height dimension of the guides along the axis designated as the Y axis in Fig. 2 depends only upon good resonator design factors, well known in the art, for matching the impedance of the electric discharge devices employed in conjunction therewith.

The spacing of the connection making means 17, 18 and 19 and consequently of the inserted discharge devices must, however, be within certain limits for optimum operation. Due to the wave pattern cut-off characteristic along the length of the guide, electromagnetic waves generated in the vicinity of the discharge devices by the pulsations of the electron stream passing between the electrodes thereof, are attenuated along the longitudinal axis of the wave guides. This attenuation is fairly rapid with length, but not extremely rapid since the wave guides are operating just at the point of longitudinal wave propagation cut-off. A twenty decibel attenuation for a distance along the length of the guide equal to one-half wave length at the operating frequency is typical. If, however, the longitudinal spacing of the discharge devices is made small enough, it has been found that the devices will operate in synchronism both as to frequency and phase due to an electromagnetic intercoupling of the generated transverse field patterns by the longitudinally attenuated wave energy therebetween. This synchronization of the transverse field patterns is made possible by the fact that the amplitude of the longitudinal wave attenuates without phase shift. Such synchronization however, can normally not be produced if the spacing between the inserted devices is greater than a distance equal to a twenty decibel attenuation of energy as measured along the length of the guide. In other words, the maximum permissible actual attenuation of the longitudinally propagated energy, which maximum attenuation normally occurs in the region midway between adjacent discharge devices, is an attenuation of approximately ten decibels down from the energy level of the transverse wave patterns established in the vicinity of the inserted devices. Closer spacing than this above prescribed limit will, of course, produce tighter coupling and better synchronization of the field patterns. If the connection making means are longitudinally spaced a distance equal to the distance covered by a longitudinal attenuation of the field energy of the order of five decibels, very good synchronization results. In terms of actual dimensions, a spacing in the order of one or two diameters of the inserted discharge devices is appropriate.

It is to be understood, of course, that the inserted electric discharge devices must all be similar even though they need not be identical, since the resonant frequency and other wave pattern characteristics are primarily determined by the dimensions of the wave guides 10 and 11. In particular, it is important that the interelectrode capacitances of the various discharge devices be approximately the same throughout in order that similar foreshortening of the transverse dimension of the wave guide is produced by each device. It has been found, however, that the tolerances to which commercial high frequency discharge devices are currently manufactured are sufficient for this purpose, and that good synchronization of such commercially available devices is easily achieved.

The distance from the respective ends 26, 27 and 28, 29 of wave guides 10 and 11 to the nearest discharge device, designated as distance $d$ in Fig. 1, must be great enough to prevent a substantial loss of energy through the ends of the guide. If the guides are open ended, as is preferable for cooling reasons, this distance should be greater than a distance equal to a ten decibel attenuation of the electromagnetic energy along the length of the guide. Preferably this distance $d$ is much greater than that producing a ten decibel attenuation of energy at the ends. With distances great enough to provide at the ends a thirty decibel attenuation of the peak energy level of the transverse wave patterns, the loss of power through the open ends is usually negligible. In terms of actual dimensions, a distance $d$ equal to approximately twice the transverse dimension of the guides, usually results in sufficient attenuation of the energy at the guide ends. If closed-ended wave guides are employed, this distance $d$ may, in some cases, need to be even greater than with open ended guides in order to prevent undesirable longitudinal modes of electromagnetic wave propagation in these end regions and in order to minimize undesirable reflections of energy from the end walls.

In Fig. 2 I have shown the apparatus of Fig. 1 as it might be connected to be employed as an amplifier of high frequency energy. As shown in Fig. 2, high frequency energy coupling means such as coaxial cables 30 and 31 terminating in suitable coupling elements such as loops 32 and 33 respectively, are provided for coupling high frequency energy to and from the wave guides 10 and 11. In order to enable different unidirectional operating potentials to be applied to the various electrodes of the inserted discharge devices through the wave guide and yet to permit high frequency currents to circulate through the walls of the guide, suitable high frequency capacitors 34 such as formed by an insulating strip 35 inserted between two corner walls of each wave guide are provided. It will be appreciated that many other types of high frequency by-passing means such as high frequency choke constructions may alternatively be used for this purpose.

When connected as an amplifier as shown in Fig. 2, high voltage from a source, such as battery 36, may be connected through a suitable voltage adjusting impedance 36a to the anode connecting wall 14 of wave guide 11. The control electrode-connected wall 12 common to both wave guides 10 and 11 may be connected to a grounded negative terminal 37 of a biasing voltage source 38 and the cathode-connected wall 13 may be connected to the negative side of battery 36 and the positive side of biasing voltage source 38. If only a small number of discharge devices, such as two or three discharge devices, are to be coupled together, only one energy transferring means such as coaxial cables 30 and 31, need be employed with each wave guide. This single energy transferring means is preferably inserted within the wave guide in a central position with respect to the longitudinal area defined by the inserted electric discharge devices. If three devices are to be coupled together for example, the loop 32 is inserted opposite to the central discharge device; while if only two discharge devices are to be coupled together, loop 32 is inserted midway between both devices. If a greater number of discharge devices are desired to be intercoupled, additional energy transferring means all adjusted to operate in exact phase with each other may be inserted at suitably spaced points along the length of the guide.

When the apparatus of Figs. 1 and 2 is operated as an amplifier, input high frequency energy is supplied to wave guide 10 through coaxial cable 30. If the transverse dimension X of the wave guide 10, as foreshortened by the control electrode-cathode capacitance of the discharge device 16, is approximately equal to one-half the wave length of the input wave, a transverse axis electromagnetic standing wave pattern is set up within guide 10. This transverse wave pattern is coupled by the attenuated energy along the length of the guide to electric discharge devices adjacent to device 16 and establishes a corresponding transverse pattern in the vicinity of these latter devices. In effect, due to the proximity of the inserted discharge devices, the wave guide 10 is transformed from a nonpropagating wave guide beyond cut-off to a conducting wave guide capable of sustaining wave pattern propagation along its longitudinal axis in the vicinity of the inserted discharge devices. The high frequency electromagnetic field thus established in the vicinity of the cathode 23 and control electrode 24 of the respective discharge devices, produces a corresponding variation in the electronic flow from cathode 23 to anode 25 of each device which, in turn, induces a similar electromagnetic field pattern in the wave guide 11. The combined energy produced in wave guide 11 by the intercoupled discharge devices, is transferred to a suitable external high frequency utilization circuit through loop 33 and coaxial cable 31. If similar discharge devices are employed with the apparatus of Figs. 1 and 2, the output power obtainable is approximately equal to the sum of that obtainable from each discharge device alone. In other words, with three similar devices, the combined output is equal to three times that of a single device.

Although I have shown my invention in Figs. 1 and 2 as adapted for use as an amplifier, it will be appreciated that the apparatus may also be employed to intercouple a number of discharge devices for use as an oscillator. The external connections to be made when employed for this purpose are well known to the art and will, therefore, not be described here. When employed in an oscillator circuit however, the apparatus of Figs. 1 and 2 may be conveniently modified to provide the desired regenerative coupling of energy from the output cavity resonator comprising wave guide 11 to the input cavity resonator comprising wave guide 10 by employing suitable coupling apertures or other high frequency coupling elements formed in or extending through the central dividing wall 12. A coupling aperture for this purpose is illustrated in Fig. 4 and designated as numeral 38.

Referring now to Fig. 3, I have shown a modification of my invention whereby energy may be transferred to and from the wave guides 10 and 11 without undue distortion of the fields even though several discharge devices are coupled together. In Fig. 3, an input wave guide 40 replaces the coaxial cable 30 and a coupling slot 41 performs the function of the loop 32 of Fig. 2. Similarly, an output wave guide 42 replaces output coaxial cable 31 and coupling slot 43 replaces the loop 33. By this arrangement a more uniform distribution of high frequency energy transfer to the inserted discharge devices is accomplished. As is well known in the art, the shape of slots 41 and 43 and particularly the height thereof may be adjusted to control the degree of coupling between the communicating wave guides. Wave guides 40 and 42 are designed in accordance with well known principles to produce electromagnetic wave propagation along the longitudinal axis thereof at the desired frequency of operation of the discharge devices as determined by the effective transverse dimension of wave guides 10 and 11.

If, for any reason, it should be desired to space the contact means a distance greater than the maximum attenuation permissible for inherent field synchronization, additional energy conducting members 45 such as shown in Fig. 4, may be secured to the wave guide between the inserted discharge devices to aid in the mutual transfer of electromagnetic field energy between the devices. These conducting members 45 which may be simple metallic or dielectric slugs, function to carry the high frequency fields adjacent one discharge device to the field region in the vicinity of an adjacent discharge device.

Referring now to Fig. 5, tuning elements 46 are shown which may comprise conduction paddles, inserted within the volume of the guides along the transverse dimension thereof in order to permit an adjustment of the frequency of resonance of the wave guide regions in the vicinity of the paddles. By rotating the tuning paddle from a horizontal position to a vertical one, a variation in the reactive loading of the adjacent inserted discharge device is produced to effect a corresponding variation in the frequency at which the wave guide regions comprising the cavity resonators for the inserted devices resonate. Other well known types of tuning elements, such as simple tuning slugs inserted within the volume of the guide, may alternatively be employed. If the electric discharge devices which are desired to be coupled together have somewhat dissimilar electrical characteristics, such tuning elements will normally be helpful in causing a synchronized operation of the devices in order that the power outputs of the various devices will be in proper, additive phase relation to each other.

It will thus be seen that I have provided a simple but versatile apparatus for coupling together the high frequency energy produced by a plurality of electric discharge devices in a manner such that the power output of the devices may be conveniently combined. The coupling apparatus is adapted for use with many different types of high frequency discharge devices and in many different types of high frequency circuits. It is to be understood that although I have shown particular embodiments of my invention, many modifications may be made and I intend by the appended claims to cover all such modifications as fall within the true spirit and scope of my invention.

What I claim as new and desire to secure by Letters Patent of the United States is:

1. Apparatus for electromagnetic energy intercoupling of at least two high frequency electric discharge devices comprising a resonator defined by an elongated wave guide section having aligned longitudinally spaced means at opposing walls for making connection with respective electrodes of respective ones of electric discharge devices inserted within said guide section whereby energy may be transferred between said guide section and each device, said guide section having a transverse dimension less than one-half wave length at a predetermined frequency across said opposing walls to support an electromagnetic wave pattern of said predetermined frequency along said transverse dimension of said guide section in the vicinity of each connection making means when said discharge devices are inserted therein while attenuating electromagnetic energy of said frequency along the length of said guide section, said connection making means being spaced apart a distance small enough to provide synchronization of the transverse wave patterns by the longitudinally attenuated energy and being spaced from the ends of said guide section a distance large enough to provide at least a ten decibel attenuation of the supported electromagnetic wave energy at the ends of the guide section.

2. Apparatus for electromagnetic energy intercoupling of at least two high frequency electric discharge devices comprising a resonator defined by an elongated rectangular wave guide section having longitudinally spaced means aligned along opposite walls thereof for making connection with electrodes of respective ones of electric discharge devices inserted within said guide section whereby energy may be transferred between said guide section and each device, said guide section having a transverse axis dimension less than one-half wave length at a predetermined frequency to support an electromagnetic standing wave pattern of said predetermined frequency along said transverse axis of said guide section in the vicinity of each connection making means when said discharge devices are inserted therein while attenuating electromagnetic energy of said frequency along the length of said guide section, said connection making means being spaced apart a distance no greater than a 20 decibel attenuation of electromagnetic energy as measured along the length of said guide section and being spaced from the ends of said guide section a distance equal to at least a ten decibel attenuation of electromagnetic energy as measured along the length of said guide section.

3. Apparatus for electromagnetic energy intercoupling of at least two high frequency electric discharge devices comprising, a resonator defined by an elongated rectangular wave guide section having longitudinally spaced means aligned along opposite walls thereof for making connection with electrodes of respective ones of electric discharge devices inserted along one transverse axis of said guide section whereby energy may be transferred between said guide section and each device, said guide section having a dimension along the other transverse axis less than one-half wave length at a predetermined frequency whereby an electromagnetic standing wave pattern of said frequency may be supported in the vicinity of inserted devices along said latter transverse axis due to the reactive loading effect of said devices while wave energy of said frequency is attenuated along the length of said guide section, said electrode connection making means being spaced apart a sufficiently small distance to enable synchronization of the transverse wave patterns in the vicinity of inserted devices by said longitudinally attenuated energy, and being spaced from the ends of said guide section a distance sufficient to provide at least a 10 decibel attenuation of the standing wave pattern energy at the ends of said guide section.

4. Apparatus for electromagnetic energy intercoupling of at least two high frequency electric discharge devices comprising a resonator defined by an elongated wave guide having longitudinally spaced means aligned along opposite walls thereof for making connection with electrodes of respective ones of electric discharge devices inserted within said guide whereby energy may be transferred between said guide and each device, said guide having a transverse axis dimension less than one-half wave length at a predetermined frequency to support an electromagnetic wave pattern of said predetermined frequency along said transverse axis of said guide in the vicinity of said connection making means when said discharge devices are inserted therein while attenuating electromagnetic energy of said frequency along the length of said guide, said connection making means being spaced apart a distance of the order of a 5 decibel attenuation of electromagnetic energy along the length of said guide and being spaced from the ends of said guide a distance equal to at least a ten decibel attenuation of electromagnetic energy along the length of said guide, and high frequency energy coupling means positioned in said vicinity of said connection means for transfer of electric energy between said guide and an external circuit.

5. Apparatus for electromagnetic energy intercoupling of at least two high frequency electric discharge devices having external electrode connections comprising, a resonator defined by an elongated wave guide section of substantially rectangular cross-section having aligned apertures formed in opposite guide walls thereof for accommodating said electric discharge devices inserted within said guide, said guide having contact fingers defining said apertures for making contact with the external electrode connections of said inserted devices, said guide having a dimension along a transverse axis parallel to said guide walls less than one-half wave length at a predetermined frequency whereby an electromagnetic wave pattern of said frequency may be supported in the vicinity of inserted devices along said latter transverse axis due to the reactive loading effect of said devices while wave energy of said frequency is attenuated along the length of said guide, said contact fingers being spaced apart a distance of the order of a 5 decibel attenuation of electromagnetic wave energy as measured along the length of said guide to enable synchronization of the transverse wave patterns in the vicinity of inserted devices by said longitudinally attenuated energy, and being spaced from the ends of said guide a distance providing at least a ten decibel attenuation of said attenuated energy at the ends of said guide.

6. Apparatus for electromagnetic energy intercoupling of at least two high frequency electric discharge devices comprising a resonator defined by an elongated wave guide section having longitudinally spaced means for making connection with electrodes of respective ones of electric discharge devices inserted within said guide between opposite sides parallel to one transverse axis whereby energy may be transferred between said guide and each device, said guide having said transverse axis dimension less than one-half wave length at a predetermined frequency to support an electromagnetic standing wave pattern of said predetermined frequency along said transverse axis of said guide in the vicinity of each connection making means when electric discharge devices are inserted therein while attenuating electromagnetic energy of said frequency along the length of said guide, said connection making means being spaced apart a sufficiently small distance to enable synchronization of the transverse wave patterns by the attenuated longitudinally travelling energy and being spaced a distance from the ends of said guide a distance sufficient to provide at least a ten decibel attenuation of a supported standing wave pattern energy at the ends of the guide, and a longitudinally extending coupling slot, formed in a side wall of said guide which extends perpendicular to said transverse axis, for high frequency energy communication with electromagnetic wave energy produced within said guide.

7. Apparatus for electromagnetic energy intercoupling of at least two high frequency electric discharge devices having external electrode connections comprising, a first elongated wave guide of substantially rectangular cross-section constituting a cavity resonator associated with each device having a transverse axis dimension less than one-half wave length at a predetermined frequency to effect a rapid attenuation of electromagnetic wave energy of said frequency along the length thereof, said first wave guide having aligned apertures formed in the opposite guide walls thereof which extend parallel to said transverse axis for receiving electric discharge devices inserted within said guide along an axis thereof perpendicular to said transverse axis whereby said transverse dimension is effectively increased to support an electromagnetic wave pattern at said frequency along said axis in the vicinity of said devices when inserted due to their capacitive loading effect, said first wave guide having contact fingers defining the rims of said apertures for making contact to the electrode connections of said inserted electric discharge devices, said contact making means being longitudinally spaced apart a distance in the order of a 5 decibel attenuation of electromagnetic wave energy along the length of said guide and being longitudinally spaced from the ends of said guide a distance greater than a ten decibel attenuation of electric magnetic wave energy along the length of said guide, and a second wave guide extending from a side wall of said first wave guide perpendicular to said apertured walls in the region of said first wave guide adjacent said contact making means, said side wall having a longitudinally extending coupling slot enabling high frequency energy communication between said first wave guide and said second wave guide.

8. Apparatus for electromagnetic energy intercoupling of at least two high frequency electric discharge devices comprising a cavity resonator defined by an elongated wave guide section having a transverse axis dimension less than one-half wave length at a predetermined frequency to effect an attenuation of electromagnetic wave energy of said predetermined frequency along the length thereof, said wave guide having longitudinally spaced means aligned on the opposite walls parallel to said transverse axis of said guide for making connection with electrodes of electric discharge devices inserted within said guide whereby the region of said guide in the vicinity of each inserted device constitutes a cavity resonator for the devices capable of sustaining an electromagnetic wave pattern of said frequency along the transverse axis of said guide, said connection making means being longitudinally spaced from the ends of said guide a distance greater than a ten decibel attenuation of electromagnetic wave energy as measured along the length of said guide, and electromagnetic energy conducting members connected to said guide between said contact making means for preventing the longitudinal attenuation of the energy between said contact making means from falling below a value sufficient to effect synchronization of transverse wave patterns established in said cavity resonator regions of said guide.

9. High frequency apparatus comprising, in combination, an elongated wave guide section, said guide having a plurality of aligned discharge device contact means along an intermediate length of each of a pair of opposing sides of said guide, at least two electric discharge devices longitudinally spaced within said guide with respective electrodes thereof in contact with said contact means, said guide constituting a cavity resonator associated with each device and having a transverse axis dimension parallel to said opposite sides less than one-half wave length at a predetermined frequency to support an electromagnetic standing wave pattern of said predetermined frequency along said transverse axis of said guide in the vicinity of each discharge device while attenuating electromagnetic wave energy at said frequency along the length of said guide, said discharge devices being separated a distance small enough that transverse wave patterns established in the vicinity of each discharge device are synchronized by longitudinally attenuated energy therebetween, and said discharge devices being spaced from the ends of said guide a distance large enough to provide at the ends of said guide at least a ten decibel attenuation of the energy of an established transverse wave pattern.

10. High frequency apparatus comprising, in combination, an elongated wave guide section, said guide having a plurality of aligned discharge device electrode contact means arrayed along a length of each of a pair of opposing sides of said guide, at least two electric discharge devices longitudinally spaced within said guide with respective electrodes thereof engaging said contact means, said guide constituting a cavity resonator associated with each device and having a transverse axis dimension parallel to said opposing sides less than one-half wave length at a predetermined frequency to support an electromagnetic wave pattern of said predetermined frequency along said transverse axis of said guide in the vicinity of each discharge device while attenuating electromagnetic wave energy at said frequency along the length of said guide, and means for exciting said resonator at said frequency and means for supplying operating voltages to said devices for establishing in said guide a transverse wave pattern of said frequency in the vicinity of each device, said wave patterns being synchronized by the longitudinally attenuated electromagnetic energy between said patterns.

11. High frequency apparatus comprising, in combination, an elongated wave guide section, said guide having a plurality of aligned discharge device contact means arrayed along a length of each of a pair of opposing sides of said guide, at least two electric discharge devices longitudinally spaced along a central region of said guide with respective electrodes thereof engaging said contact means, said guide constituting a cavity resonator associated with each device and having a transverse dimension parallel to said pair of opposing sides less than one-half wave length at a predetermined frequency whereby an electromagnetic wave pattern of said frequency may be established along said transverse dimension in the vicinity of said discharge devices while electromagnetic wave energy at said frequency is attenuated along the length of said guide, and means for exciting said resonator at said frequency and means for supplying operating voltages to said devices for establishing an electromagnetic wave pattern of said frequency in the vicinity of each device, said discharge device being separated a distance no greater than a 20 decibel attenuation of energy as measured along the length of said guide whereby said wave patterns are synchronized by said longitudinally attenuated wave energy.

12. High frequency apparatus comprising, in combination, an elongated wave guide of substantially rectangular cross-section, said guide having a plurality of aligned discharge device electrode contact means arrayed along a length of each of a pair of opposing sides of said guide, at least two electric discharge devices with respective electrodes thereof engaging said contact means longitudinally spaced along a central region of said guide, said guide constituting a cavity resonator associated with each device and having a transverse dimension parallel to said pair of opposing sides slightly less than one-half wave length at a predetermined frequency whereby an electromagnetic standing wave pattern of said frequency may be established in the vicinity of said discharge device while electromagnetic wave energy at said frequency is attenuated along the length of said guide, means for exciting said resonator at said frequency and means for supplying operating voltages to said devices for establishing an electromagnetic wave pattern of said frequency in the vicinity of each device, said discharge device being separated a distance no greater than a 20 decibel attenuation of energy along the length of said guide whereby said wave patterns are synchronized by said longitudinally attenuated energy, and high frequency energy coupling means positioned in said vicinity of said discharge devices for extracting electric energy from said wave patterns established in said guide.

13. High frequency apparatus comprising, in combination, an elongated wave guide section, said guide having a plurality of aligned discharge device contact means spaced in lengthwise array along each of a pair of opposing sides of said guide, at least two electric discharge devices with respective electrodes thereof engaging said contact means longitudinally spaced along a central region of said guide, said guide constituting a cavity resonator associated with each device and having a transverse dimension parallel to said pair of opposing sides slightly less than one-half wave length at a predetermined frequency whereby an electromagnetic standing wave pattern of said frequency may be established in the vicinity of said discharge device while electromagnetic wave energy at said frequency is attenuated along the length of said guide, means for exciting said resonator at said frequency and means for supplying operating voltages to said devices for establishing an electromagnetic wave pattern of said frequency in the vicinity of each device, said discharge device being separated a distance no greater than a 20 decibel attenuation of energy along the length of said guide whereby said wave patterns are synchronized by said longitudinally attenuated energy, and tuning means inserted within said guide in the vicinity of said established wave patterns for adjusting the frequency thereof.

14. Apparatus for electromagnetic energy intercoupling of at least two high frequency electric discharge devices of the disk-seal type having consecutively spaced electrodes including a cathode, control electrode, and anode comprising; a pair of elongated wave guides having a common wall between them including therein a longitudinally spaced array of apertures together with aligned connection means at the walls parallel to said common wall for making connection to selected electrodes of said discharge devices when inserted within said guides, whereby one of said guides constitutes a control electrode-cathode resonator for said devices and the other of said guides constitutes a control electrode-anode resonator for said devices, said guides having a transverse dimension across said common wall and said parallel walls slightly less than one-half wave length at a predetermined frequency whereby an electromagnetic standing wave pattern of said frequency may be established along said transverse dimension in the vicinity of said discharge devices while electromagnetic wave energy at said frequency is attenuated along the length of said guide, said electrode connection making means being separated a distance of the order of a five decibel attenuation of energy along the length of said guides and being spaced from the ends of said guides a distance greater than a ten decibel attenuation of energy along the length of said guide, and high frequency energy coupling means coupled with said control electrode-anode connected guide for extracting electric energy from wave patterns established therein.

References Cited in the file of this patent

UNITED STATES PATENTS

| | | |
|---|---|---|
| 2,153,728 | Southworth | Apr. 11, 1939 |
| 2,284,405 | McArthur | May 26, 1942 |
| 2,353,742 | McArthur | July 18, 1944 |
| 2,404,261 | Whinnery | July 16, 1946 |
| 2,434,116 | McArthur | Jan. 6, 1948 |
| 2,565,112 | Altar | Aug. 12, 1951 |
| 2,573,746 | Watson | Nov. 6, 1951 |

OTHER REFERENCES

Publication I—Ragan: Microwave Transmission Circuits, vol. 9, M. I. T. Rad. Lab. Series, published 1948, McGraw-Hill, pages 358–61.